United States Patent Office 3,402,326
Patented Sept. 17, 1968

3,402,326
INSULATION FAULT CONTROL DEVICE WITH LIGHT SENSITIVE ELEMENTS
Roger Adrien Guasco, Draveil, and Jérôme Ignacio, Bondy, France; said Ignacio assignor to Ateliers de Constructions de Vaux, Andigny (ACOVA), Paris, France, a French body corporate
Filed May 10, 1966, Ser. No. 548,903
Claims priority, application France, May 10, 1965, 16,468; May 4, 1966, 60,220
8 Claims. (Cl. 317—18)

ABSTRACT OF THE DISCLOSURE

In an electrical apparatus having an accessible conductive part and a normally insulated electrical circuit fed by a power supply network, a safety device is provided for protection against an insulation fault causing said accessible part to reach a dangerous voltage, said device including an automatic circuit breaker, the operation of which is controlled by a photoelectric circuitry comprising an electroluminescent element to which is applied a voltage deriving from said fault, and a photoconductive element optically coupled to said electroluminescent element and operative when illuminated for opening said circuit breaker.

---

The present invention generally relates to control devices for detecting insulation faults in electrical apparatus.

Most electrical apparatus, and notably home appliances and the feed power supplies for work-shops and industrial plants, are subjected to severe regulations as to safety in that the accessible metallic parts of the apparatus or installation must be prevented from reaching dangerous voltages, say voltages exceeding 24 volts, with respect to ground. To this end, control devices are known, which incorporate differential relays, voltmeters or other electromechanical or electronical instruments of delicate construction, high cost, and eventually questionable reliability.

It is an object of this invention to provide a control device for detecting an insulation fault in electrical apparatus which is simple and rugged in its design, easy to fabricate and to install at low cost.

It is another object of this invention to provide a control device of the kind referred to which presents high sensibility and reliability.

It is a further object of this invention to provide a control device of the kind referred to which is capable of various uses.

These and other objects are fulfilled by a control device according to the invention for detecting an insulation fault in electrical apparatus, said device comprising an electroluminescent element, means for applying to the same a voltage resulting from said fault, thereby switching said electroluminescent element, and a photoconductive element optically coupled to said electroluminescent element, said photoconductive element forming a part of and acting as a switch in control means associated to said apparatus.

Other features and advantages of the invention will become apparent from the following description when taken in conjunction with the accompanying drawings. In said drawings, for illustrative purposes only, are shown several embodiments of the invention.

Figure 1:
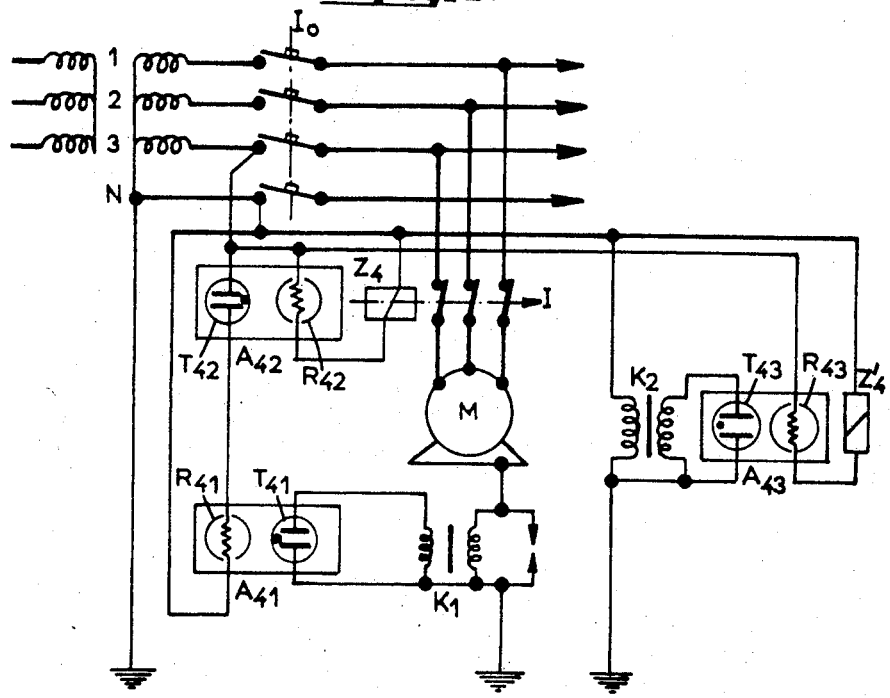
FIGURE 1 illustrates a feed power supply network incorporating control devices according to this invention.

There is shown on FIGURE 1 a three phase supply network feeding an electric motor M, for example a motor driving a machine-tool. Said network includes a step-down transformer having three couples of primary and secondary windings designated 1, 2 and 3 respectively; the secondary windings are mounted in Y-connection, their one ends being connected to respective feed-lines and their opposite ends being connected to a common or star point to which is branched a neutral grid N, which is grounded. The three feed-lines and the neutral grid are controlled by a multiple switch or general contactor $I_0$ provided with conventional actuating means. The electric motor M is connected to the three feed-lines through the intermediary of a multiple switch or contactor I.

The installation shown on FIGURE 1 includes a first control device for detecting insulation faults within the electrical motor M, which would bring the motor frame to a dangerous voltage. Said control device comprises a first detector and amplifier designated A41, which includes an electroluminescent element, such as a gas discharge tube T41, and a photoconductive element such as photoresistor R41 optically coupled to the former element; tube T41 is connected between the frame of motor M and the ground through the intermediary of a suitable step-up autotransformer K1; photoresistor R41 is connected between the neutral grid N and one feed-line in series with a gas discharge tube T42, constituting the input element of a second amplifier A42, which further includes a photoresistor R42 optically coupled to said tube T42; said photoresistor R42 is connected between the neutral grid N and one feed-line in series with a winding or relay Z4 providing for automatic release of contactor I.

It will be understood that, in normal operation, no substantial voltage appears across the primary winding of autotransformer K1, through which the frame of motor M is grounded. Accordingly, no voltage is fed to tube T41, so that the very high impedance of photoresistor R41 under obscure condition prevents energization of tube T42; in a similar manner, the very high impedance of photoresistor R42 under obscure condition prevents energization of the release winding or relay Z4.

Whenever an insulation fault appears in electric motor M, which results in bringing the frame of said motor in relation with at least one of its feed-lines, the potential of said frame is raised with respect to ground, so that a voltage, which is advantageously limited by a spark-gap system, is applied to the primary winding of autotransformer K1; the electromotive force induced in the secondary winding of said autotransformer causes switching of tube T41 to lighted condition, so that the impedance of photoresistor R41 drops to a relatively low value, thus enabling switching of tube T41 to lighted condition; the impedance of illuminated photoresistor R42 drops to a sufficiently low value to allow for excitation of winding or relay Z4, thus causing automatic release of contactor I.

The installation shown in FIGURE 1 further includes a control device for detecting a neuter fault, that is the breaking of the connection between the neutral grid N and ground. Said last mentioned control device comprises a step-up autotransformer K2, the primary winding of which is connected between the neutral grid N and ground, and the secondary winding of which feeds a gas discharge tube T43; said tube constitutes the input element of a detector and amplifier A43 which further includes a photoresistor R43 optically coupled to tube T43. Photoresistor R43 is connected in series with a winding or relay Z'4 between the neutral grid N and one feed-line. In normal operation, no voltage appears across the primary winding of autotransformer K2, so that no voltage is fed to tube E43; accordingly, the very high impedance of photoresistor R43 under obscure condition prevents energization of winding or relay Z′4; whether the ground connection of neutral grid N is broken, and as soon as the resulting voltage applied by autotransformer K2 to tube T43 reaches a predetermined value, said tube is switched to lighted condition; accordingly, the impedance of photoresistor R43 drops to a sufficiently low value to allow for energization of winding or relay Z′4, which may cause automatic release of general contactor I₀ by way of example.

Figure 2:
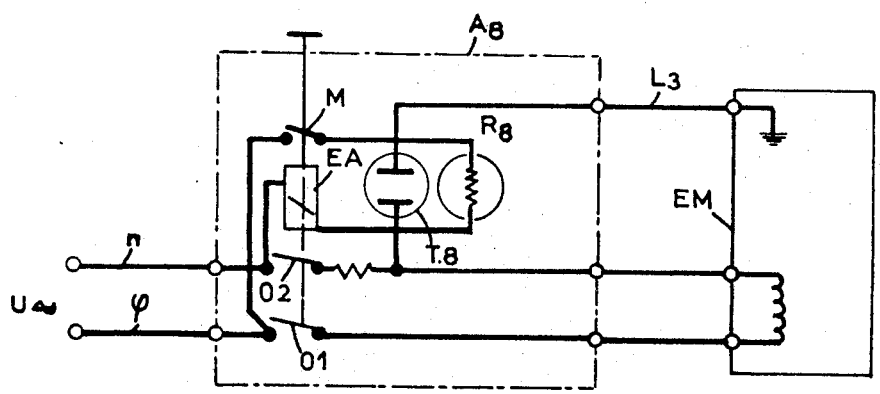
FIGURE 2 is a schematic diagram of a control device according to the invention for protection of a movable or portable electrical apparatus.

There is shown on FIGURE 2 a schematic wiring diagram of a control device according to this invention adapted to detect an insulation fault in portable or movable electrical apparatus such as home appliances.

The control device A8 as shown may be incorporated either to the apparatus EM to be protected, or to the power source to which it is connected.

Control device A8 includes an automatic contact breaker having first and second contacts O1, O2 controlling respectively a phase conductor $\phi$ and a neutral conductor $n$ by which the apparatus EM is fed from a single phase alternating current supply $U_\infty$; the aforesaid automatic circuit breaker may be provided with any conventional automatic release means; as shown it includes thermal release means in the form of a bi-metallic element and a heating resistor associated to contact O2; and magnetic release means, in the form of an electromagnet EA operative for opening contacts O1, O2; the aforesaid circuit breaker further includes hand-rest means and a third normally opened contact M moving solidly with contacts O1, O2.

Control devices A8 and electrical apparatus EM are connected by means of three conductors, namely aforesaid neutral conductor $n$ and phase conductor $\phi$ and a third conductor L3, one end of which is connected to the frame or body of electrical apparatus EM, and the other end of which is connected to one plate of an electroluminescent element, such as a gas discharge tube T8 incorporated to control device A8, the other plate of which is connected to neutral conductor $n$.

A photoconductive element such as a photoresistor R8 is optically coupled to tube T8, and is electrically connected in series with electromagnet EA and contact M between the neutral and phase conductors $n$, $\phi$.

In normal operation, electrical apparatus EM is fed through closed contacts O1, O2, and no voltage is applied to tube T8, which therefore remains switched off; photoresistor R8 under obscure condition presents a very high impedance equivalent to an opened contact, and thus prevents electromagnet EA from being energized through closed contact M. Whether an accidental short circuit or like fault within apparatus EM causes the intensity of the current supplied to said apparatus to increase to an excessive value, the circuit breaker will be opened by the action of its thermal automatic release means. Whether an insulation fault brings the frame or body of an electrical apparatus EM into contact with its feed circuit, the resulting fault voltage is supplied through conductor L3 to tube T8, which is therefore siwtched to lighted condition; the light produced by said tube impinging on photoresistor R8 causes the impedance of the same to drop to a relatively low value, thus allowing for energization of electromagnet EA and subsequent release of the circuit breaker. The faulty apparatus is thus completely insulated from the power source, and hand-resetting of the circuit breaker will be prevented by electromagnet EA as long as the fault persists.

Figure 3:
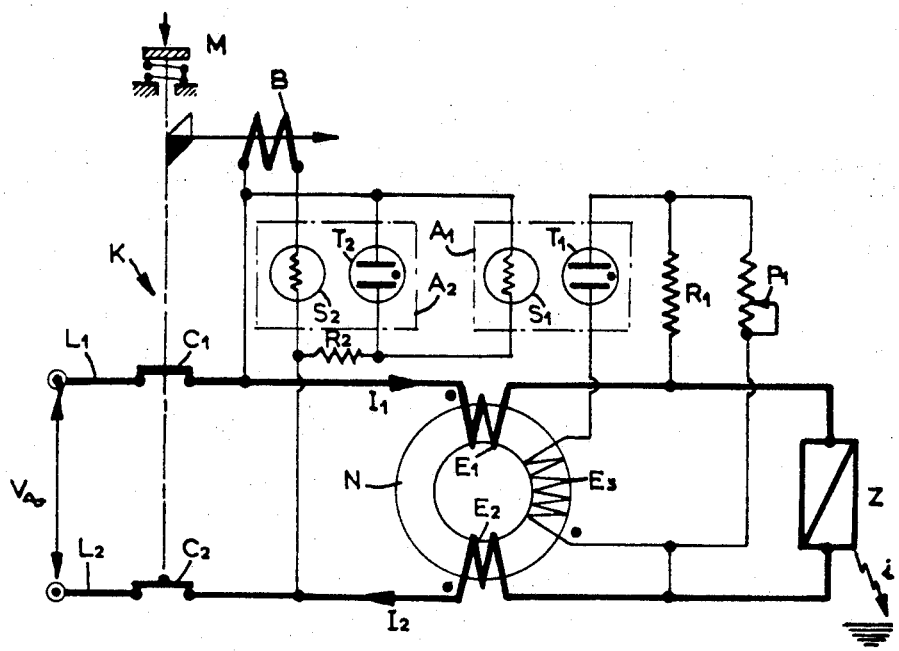
FIGURE 3 is a schematic diagram of a differential control device according to this invention.

FIGURE 3 is a schematic wiring diagram of a further embodiment of this invention, namely a differential control device for detecting an insulation fault in an electrical apparatus Z fed by two lines L1, L2 from an AC power supply $V_\infty$. As shown, energization of the apparatus or load Z is controlled by a contactor or like automatic switch K comprising normally opened contacts C1, C2, controlling the feed-lines L1, L2 respectively, contactor K being provided with automatic release means in the form of a winding or electromagnet B, and with handreset means M.

The feed-lines L1, L2, include respective series windings E1, E2 wound on a same magnetic core N, on which is further wound a control winding E3; windings E1, E2 are identical and comprise each a few turns, said windings being so coupled to core N, that their magnetomotive forces are balanced under normal conditions, that is when the currents I1, I2 flowing through lines L1, L2 respectively are equal.

Control winding E3 is connected across lines L1, L2 in series with a resistor R1 and an electroluminescent element such as a gas discharge tube T1, forming part of a first detecting and amplifing device A1 according to this invention; an adjustable resistor or potentiometer P1 is connected in parallel to control winding E3 and tube T1; said amplifying device A1 further includes a photo-conductive element such as a photoresistor S1 optically coupled to tube T1 and electrically connected in parallel to another gas discharge tube T2 forming a part of a second amplifying device A2; photoresistor S1 and tube T2 are fed from lines L1, L2 through a voltage dropping resistor R2; the amplifying device A2 further includes a photoresistor or like element S2 optically coupled to tube T2 and electronically connected across lines L1, L2 in series with the aforesaid automatic release winding B of contactor K.

It will be understood that in normal operation, that is when currents I1, I2 are of equal intensities, no electromotive force is induced in control winding E3. Therefore, the voltage applied to the tube T1 corresponding to the voltage drop across potentiometer P1, which forms with resistor 31 a voltage dividing bridge; potentiometer P1 is adjusted so that the voltage applied to tube T1 holds the same in lighted condition. Photoresistor S1 being thus illuminated presents a relatively low resistance, so that tube T2 is substantially short-circuited and therefore remains obscure. Accordingly, photoresistor S2 presents a very high resistance substantially equivalent to an opened contact, and thus prevents automatic release winding B from being energized.

Whether the protected apparatus or load Z presents an insulation fault, a current $i$ is derived from the feed-circuit. The balance of the magnetomotive forces of windings E1, E2 is thus impaired, and a corresponding differential electromotive force is induced in control winding E3.

Owing to a suitable coupling of said control winding to magnetic core N, said electromotive force is in opposition with the supply voltage $V_x$, and therefore causes tube T1 to be switched off. The impedance of photoresistor S1 thus increases to a very high value which allows for switching tube T2 to lighted condition; the impedance of illuminated photoresistor S2 drops to a relatively low value, so that winding B is energized and causes automatic release of contactor K.

The control devices shown and described present numerous advantages over the previously known equivalent devices, notably as to their sensibility, reliability and low cost. The association of electroluminescent elements and photoconductive elements afford inherent advantages, resulting from the sharp cut-off characteristics and the low power requirements of the electroluminescent elements, and from the ability of the photoconductive elements to dissipate a substantial power; these features afford suitable detection characteristics combined with power amplification. The structure is rugged, easy to fabricate and to install and requires no maintenance.

As a conclusion, it will be understood that the invention is not limited to the illustrative embodiments thereof as described and shown; since modifications of the same may be varied without departing from the spirit of this invention as defined in the appended claims.

What we claim is:

1. In an electrical apparatus having an accessible conductive part normally held at ground potential and a normally insulated electrical circuit fed by a power supply network, a ground fault monitoring device for protecting said apparatus against an insulating fault which would cause said accessible part to reach a predetermined dangerous voltage with respect to ground, said device comprising in combination switch means operative for disconnecting said apparatus from said supply network, relay means associated to said switch means for automatic release thereof, and a photoelectric circuitry operative for detecting said fault and thereupon energizing said relay means, said circuitry including at least one detector and amplifier unit consisting of an electroluminescent input element having a predetermined lighting voltage, optically coupled to a photoconductive output element having a high impedance under obscure condition and low impedance when illuminated, first circuit means operatively connecting said input element between said accessible part and ground so that the state of said input element is switched when said part reaches said predetermined voltage, and second circuit means operatively connecting said output element to said relay means to allow for energization of the latter when the state of said input element is switched.

2. A device according to claim 1, wherein said first circuit means include a voltage step-up transformer.

3. A device according to claim 1, wherein said first circuit means is connected to ground through a neutral grid of said supply network.

4. A device according to claim 1, where in said second circuit means include a second detector and amplifier unit, the electroluminescent and photoconductive elements of which are optically coupled together and are electrically connected to said output element of said first mentioned unit and to said relay means respectively.

5. In an electrical apparatus having an accessible conductive part normally held at ground potential and a normally insulated electrical circuit fed by a power supply network, a ground fault monitoring device for protecting said apparatus against an insulation fault which would cause said accessible part to reach a predetermined dangerous voltage with respect to ground, said device comprising in combination switch means operative for disconnecting said apparatus from said supply network, relay means associated to said switch means for automatic release thereof, and a photoelectric circuitry operative for detecting said fault and thereupon energizing said relay means; said circuitry including at least one detector and amplifier unit consisting of an electroluminescent element having a predetermined lighting voltage, optically coupled to a photoconductive element having a high impedance under obscure condition and a low impedance when illuminated, first circuit means operatively connecting said input element to a a separate winding of a differential current transformer associated to said electrical circuit so that the state of said input element is switched when said accessible part reaches said predetermined voltage, and second circuit means operatively connecting said output element to said relay means to allow for energization of the latter when the state of said input element is switched.

6. A device according to claim 5, wherein said first circuit means includes an adjustable resistor mounted in parallel to said input element and separate winding connected in series.

7. A device according to claim 6, wherein said second circuit means is fed by said electrical circuit through a fixed resistor.

8. A device according to claim 5, wherein said second circuit means includes a second detector and amplifier unit, the electroluminescent and photoconductive elements of which are optically coupled together and electrically connected to said output element of said first mentioned unit and to said relay means respectively.

References Cited

UNITED STATES PATENTS

| 2,844,765 | 7/1958 | Sosnoski | 317—18 |
| 3,213,321 | 10/1965 | Dalziel | 317—18 |
| 3,242,383 | 3/1966 | Opad | 317—124 X |
| 3,248,549 | 4/1966 | Sanabria | 317—124 X |
| 3,307,076 | 2/1967 | Park | 317—124 X |

FOREIGN PATENTS 201,698  7/1958  Austria.

LEE T. HIX, *Primary Examiner.*

R. V. LUPO, *Assistant Examiner.*